Figure 1:
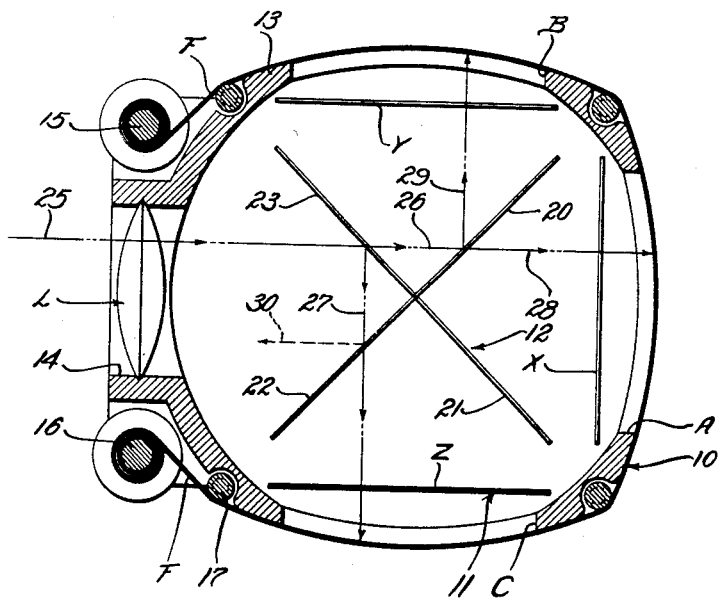

June 16, 1942.  W. L. WRIGHT  2,286,526
OPTICAL SYSTEM FOR CAMERAS AND THE LIKE
Filed Oct. 11, 1940

Inventor
WALTER L. WRIGHT
By
His Attorney

Patented June 16, 1942

2,286,526

UNITED STATES PATENT OFFICE 2,286,526

OPTICAL SYSTEM FOR CAMERAS AND THE LIKE

Walter L. Wright, Santa Monica, Calif., assignor to Synchrome Corporation, Santa Monica, Calif., a corporation of California Application October 11, 1940, Serial No. 360,774

10 Claims. (Cl. 88—1)

This invention relates to photographic equipment and relates more particularly to light handling means or optical systems for cameras and the like. A general object of this invention is to provide an improved particularly effective and inexpensive light dividing means for a multi-color or natural color camera.

Another object of this invention is to provide improvements in photographic apparatus of the character disclosed in United States Letters Patent 2,127,197, granted to me August 16, 1938.

A light dividing means is required in the camera when simultaneously producing a plurality of negatives of different chromatic values of a subject taken from a single point of vision and for use in the production of multi-color or natural color pictures. In most prior cameras intended for this purpose prisms or rather thick glass plates have been employed as the light dividing elements. Such light dividing elements are expensive and produce distortions and double images requiring the provision of other optical means for correcting or compensating for such distortions and parallax. In my issued patent above referred to I disclosed a set of light transmitting and reflecting elements of very thin material arranged in crossed relation to divide the incoming light so that it passes through a central film aperture and is directed through two side film apertures. This arrangement of thin crossed reflectors is inexpensive and overcomes the defects of the prior prism type and thick reflector type systems. Another defect common to the reflector type light dividers is the unequal illumination resulting from the greatest reflecting action at the reflector portions most remote from the lens where the light strikes the reflector at the most acute angles. I have also found that in employing crossed reflectors there is an uneven distribution of light at the film apertures caused by a light loss at the front arms or sections of the crossed reflectors. The incoming light first strikes the front sections of the cross and some of the light is transmitted by these sections to be divided by the rear sections of the cross, while the remaining light is reflected laterally. The light reflected laterally by the front section at one side of the cross must pass through the other front section of the cross on its way to the side film aperture. There is a loss in the laterally directed light by reason of the forward reflection of a part of the light at said other front section. The light loss resulting from the unrecoverable second reflection at the front cross sections lowers the value of portions of the side negatives while the central negative is fully and evenly illuminated and there is an uneven or unbalanced value condition in the series of negatives.

Another and important object of this invention is to provide a crossed-reflector light dividing means of the character above referred to which produces even, balanced illumination of the plurality of fields of the negative.

Another object of this invention is to provide a crossed-reflector light dividing means of the character referred to which eliminates the uneven illumination of the negative fields without interfering with the color influencing action or the chromatic values of the divided light and without the excessive obstruction of the light.

Another object of this invention is to provide a crossed-reflector light dividing means of the character referred to which prevents the undesirable reflection of light from one aperture to the other.

Another object of this invention is to provide a crossed-reflector light dividing means in which the reflectors may be set or positioned at varied or selected angles to the main optical axis to permit a wide latitude in the design of the camera, to provide for the selected or required spacing of the images on the film and probably more important to vary the reflecting action to cause more or less light to be reflected where the light from the lens strikes the reflectors at the most acute angles.

A further object of this invention is to provide a crossed-reflector optical system or light dividing means of the character mentioned which is very simple and inexpensive and capable of ready modification and variation to provide for the desired color values, saturations, etc., of the resultant picture images.

Figure 2:
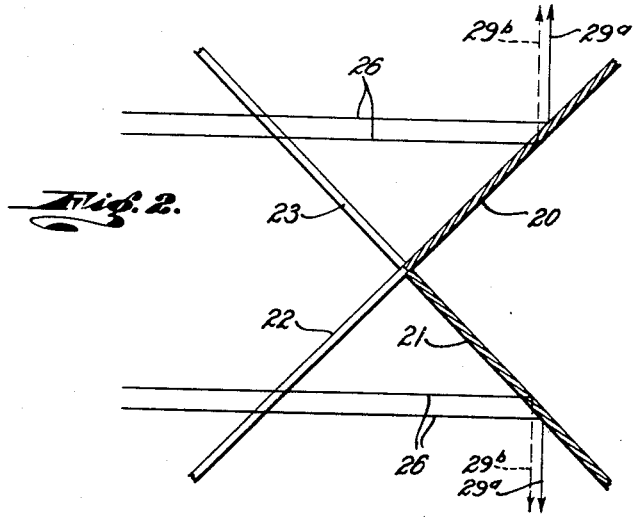

The various objects and features of my invention will be fully understood from the following detailed description of a typical preferred form and application of my invention, throughout which description reference is made to the accompanying drawing, in which:

Fig. 1 is a central longitudinal sectional view of a still picture camera embodying the features of the invention showing the optical elements in elevation and illustrating the paths taken by a portion of the light entering tse camera and Fig. 2 is an enlarged fragmentary diagrammatic view of the crossed reflectors embodied in the invention.

The present invention is adapted for embodiment in forms for use in still picture cameras, motion picture cameras and other photographic apparatus where the division of light and the chromatic influencing of the light is required. In the following detailed description I will describe the simple form of the invention illustrated in the drawing which is provided in a still picture camera, it being understood that the invention is not to be construed as limited or restricted to this particular embodiment.

The photographic apparatus of the present invention may be said to comprise, generally, a support or body 10 having an intermediate film aperture A and side apertures B and C, light filtering means 11 at the apertures A, B and C and light dividing means 12 in the body 10 for dividing the incoming light for passage through the apertures A, B and C.

The present invention is not primarily concerned with the structural features or details of the body 10 or the film handling equipment. In the drawing these structures are shown in a more or less schematic manner. The body 10 may be a hollow frame-like structure having a curved or partially curved wall 13. A light receiving opening 14 is provided in the front of the body 10 and is equipped with a suitable lens L. The wall portion of the body 10 directly opposite or aligned with the light admitting opening 14 has the film aperture A while the apertures B and C are provided in the opposite side parts of the body wall 13. In the case illustrated the apertures A, B and C are spaced substantially 90° apart, it being understood that this spacing or relation may be varied. The negative film F is trained around the body wall 13, extending from a supply roll 15 to a take-up roll 16. The rolls 15 and 16 may be rotatably mounted on the front of the body 10 at opposite sides of the light admitting opening 14. Suitable guide rolls 17 are set in the exterior of the body wall 13 to carry and guide the film F. The film is arranged to extend across the mouths or outer sides of the apertures A, B and C.

The filtering means 11 is provided to chromatically influence the divided light directed through the apertures A, B and C by the means 12 to produce exposures or negatives on the film F of different chromatic values. The means 11 comprises a light filter at each aperture A, B and C, there being a filter X at the aperture A, a filter Y at the aperture B and a filter Z at the aperture C. The filters X, Y and Z are proportioned and arranged to act on all the light which reaches their respective apertures A, B and C. In the drawing the filters X, Y and Z are arranged within the body wall 13 at or immediately adjacent the apertures. The light filters X, Y and Z may be straight or flat as illustrated, in which case they may be constructed of glass or the like, or the filters may be curved to conform generally to the curvature of the body wall 13 and film F in which case they are constructed of gelatin, cellulose, or the like, and are quite thin.

Reference is hereby made to my issued patent above referred to for a disclosure of curved gelatin filters suitable for use in the present invention and for a disclosure of means for mounting such filters at the film apertures A, B and C. The color values of the filters X, Y and Z may be as selected or required for the production of the desired multi-color or natural color pictures. For the purposes of example it may be assumed that the filter X has a green value, the filter Y a violet value and the filter Z an orange value. As will be later described the colors of the filters X, Y and Z and their relation to one another may have a special or given relation to certain elements of the means 12 to produce even illumination of the film F at the apertures A, B and C.

The light dividing means 12 embodies important features of the invention. The means 12 serves to divide the light, passed by the opening 14 and the lens L, into three separate or distinct beams and to direct these beams through the filters X, Y and Z and the apertures A, B and C to the film F. The means 12 comprises angularly related or cross reflectors mounted in the body 10 in the path of the incoming light. In the present disclosure it will be assumed that there are four reflectors 20, 21, 22 and 23 arranged in converging relation to each constitute an arm or a section of a cross assembly. The sections 20, 21, 22 and 23 may be separate elements or may be joined or formed in pairs in V relation or in straight planes. In any case the front sections are plain or uncolored and the rear sections are colored, made partially opaque or both as will be later described, the lines of separation of the sections occurring at the focus point of the cross. The point of convergence of the reflectors 20, 21, 22 and 23, or the center of the cross assembly, is preferably in the main optical axis and where the apertures A, B and C are related, as above described, the reflectors are disposed at approximately 45° to said main optical axis. It is to be understood that where the apertures A, B and C bear a relation different from that illustrated the reflectors 20, 21, 22 and 23 may be arranged at different angles to the principal optical axis.

The reflectors 22 and 23 may be termed the front reflectors while the reflectors 20 and 21 may be termed the rear reflectors. In accordance with the invention the reflectors 20, 21, 22 and 23 are formed of a very thin light transmitting and light reflecting material. It is preferred to make the reflectors 20, 21, 22 and 23 about .0001 or .0002 of an inch thick. The reflectors 20, 21, 22 and 23 may be formed of a gelatinous material or of a cellulose material stretched or made taut. Reference is hereby made to my issued patent above referred to for a disclosure of a suitable means for mounting or supporting the reflectors 20, 21, 22 and 23, the present invention not being primarily concerned with the manner of constructing or mounting the reflectors. With the reflectors 20, 21, 22 and 23 made very thin, as above described, there is no apparent or visible double image resulting from light reflection from their front and rear surfaces.

Referring now to Fig. 1 of the drawing and assuming that the several reflectors 20, 21, 22 and 23 are clear or without color, a light beam will be divided or directed as illustrated by the dot and dash lines and by the broken lines of Fig. 1. The entering light is represented in Fig. 1 by the line 25. The light following the line 25 first encounters the reflector 23 and is divided or transmitted and reflected by the reflector 23 so that a portion of the light follows the axial path 26 and a second portion follows the lateral path 27. The light travelling along the path 26 encounters the rear reflector 20 and is again divided by the reflector 20 to have a portion pass straight rearwardly along the path 28 to the aperture A and to have a second portion reflected laterally along the path 29 to the aperture B. The light travelling the path 28 is of course influenced by the filter X and the light travelling along the path 29 is influenced by the filter Y. It will be observed that there is little or no light loss in the light following the paths 26, 28 and 29 and the film at the aperture A and at the rear portions of the apertures B and C receive full illumination. The illumination of these aperture portions is increased relative to the illumination of the front aperture portions because of the acute angle of the light to the reflecting surfaces. The second mentioned portion of the divided light reflected from the reflector 23 travels along the path 27 toward the aperture C and encounters the front reflector 22. The major portion of the light travelling the path 27 is transmitted directly through the reflector 22 to the aperture C, being influenced by the filter Z before it reaches the film F. There is, however, a substantial portion of the light travelling the path 27 which is reflected forwardly by the reflector 22 along a path such as 30. This light directed forwardly along the path 30 is lost and cannot be recovered. The light loss resulting from the forward reflection of the light by the reflector 22, as indicated at 30, lessens the illumination of the forward portion of the negative film F at the aperture C, there being little or no loss of illumination at the rear portion of the aperture C and an unbalanced illumination condition exists at the aperture. While I have described the action of the plain or clear reflectors 20, 21, 22 and 23 upon a light beam at one side of the principal optical axis it will be understood that a similar action takes place at the other side of the optical axis and there will be an uneven illumination of the picture area at the aperture B.

The present invention overcomes, compensates for or eliminates the unequal illumination condition described in the preceding paragraph which may result from the second reflection at the front reflectors 22 and 23, or by the increase in the angle of the light to the rear reflectors 20 and 21 or both. The rear cross sections or rear reflectors 20 and 21 are formed of a material which is neutral in color or which has a given hue or color bearing a given relation to the filters X, Y and Z or which is both neutral or tinted to control or lower the value of the light reflected by and transmitted through them. The invention contemplates the treatment, coloring or constructing of the reflectors 20 and 21 in various manners to compensate for the uneven illumination condition above described. By constructing the reflectors 20 and 21 of a material having a color value that is substantially completely absorbed by the filters Y and Z it is possible to entirely eliminate or absorb the light which is reflected from the rear surfaces of the reflectors 20 and 21 and thus reduce the unequal illumination condition. This may be accomplished without any appreciable light loss at the aperture A by giving the reflectors 20 and 21 the same color as the filter X or by forming the reflectors to transmit the same color as the filter X. For example, the color of the rear reflector sections 20 and 21 may be green and the filter X may be green as above described, or said reflectors and the filter X may all be orange or violet or any other required color. The invention contemplates considerable variation in the hue and saturation of color of the reflectors 20 and 21 to bring about the desired degree of light absorption by the filters X and Y and the desired transmission of light to the aperture A. It will be evident that with a given relationship in color values of the filters X, Y and Z and the reflectors 20 and 21 that the rear surface reflection from the reflectors 20 and 21 may be filtered out by the filters Y and Z to assure an even illumination condition at the apertures B and C, while at the same time providing the desired illumination at the aperture A.

In the case where the crossed reflectors are clear or without color there is a greater illumination of the film F at the aperture A than at the apertures B and C, where the light is reflected. This illumination differential may be overcome by the use of a neutral filter at the aperture A in combination with a filter such as the filter X to lower the illumination at that aperture to the desired value. In accordance with the present invention the rear reflectors 20 and 21 may be made neutral (grey) to bring about the lessening of the illumination at the aperture A while at the same time reducing the value of the light reflected by the rear surfaces of the reflectors 20 and 21 and thus bringing about the desired balanced illumination condition at the apertures B and C. In other words, the reflectors 20 and 21 may be formed of a chromatically neutral material to bring about a desired lessening of illumination at the aperture A and a desirable reduction in the illumination at the rear portions of the apertures B and C with an equalized or balanced illumination condition through the several apertures. When the rear reflectors 20 and 21 are merely made chromatically neutral or partially opaque, as just described, color filters X, Y and Z of any selected colors may be arranged at the apertures A, B and C to produce the required or desired chromatically different picture records on the film F.

Fig. 2 illustrates the manner in which the colored or neutralized reflectors 20 and 21 operate to reduce the value of the light reflected toward the apertures B and C. The light travels the paths 26 as above described and this light which is reflected from the front surfaces of the reflectors suffers litttle or no loss when directed along the paths 29$^a$. On the other hand the light reflected laterally by the rear surfaces of the reflectors 20 and 21 is reduced in value by reason of its passage through the material of the reflectors and this controlled or lessened light is represented by the broken or finer lines 29$^b$.

The invention further contemplates forming the rear reflectors 20 and 21 with a color and at the same time partially neutral and the relative proportions of the color and the neutral factors can be varied widely between a situation where the reflectors are neutral with only a mere suggestion of color and a situation where the the reflectors having a distinct color with only a small amount of the neutral pigment or material. By making the reflectors 20 and 21 both colored and neutral, as just rescribed, the light value as well as the color value of the light transmitted by said reflectors and reflected off by the rear surfaces of the reflectors is controlled. With a given chromatic value in the reflectors 20 and 21 and a given neutral value in the reflectors correctly related chromatic values at the filters X, Y and Z, a correct balance of light values may be obtained at the three apertures A, B and C. In some cases it may be desired to give the reflectors 20 and 21 a sufficient color saturation to make the use of the filter X unnecessary, the reflectors 20 and 21 serving as color filters for the aperture A as well as reflectors for the light travelling the paths 26 and 29 to the apertures B and C, the light travelling the paths 26 and 29 being reduced in value before reaching the apertures B and C by reason of the chromatic relation between the reflectors 20 and 21 and the filters Y and Z.

In each of the above mentioned manners of carrying out the invention the light reflected by the rear surfaces of the reflectors 20 and 21 is reduced in value to provide for the balanced illumination of the film at the apertures B and C and the light transmitted through the reflectors 20 and 21 to the aperture A may be reduced in value to bring the illumination at the aperture A into balance with the illumination at the apertures B and C. In addition to the illumination balancing action above described, the neutral and/or colored reflectors 20 and 21 serve to control or shield, to a large extent, the stray light that is present behind the crossed reflector assembly. The rear reflectors 20 and 21 serve to partition off and markedly reduce the value of the light reflected forwardly from the front surface of the color filter X which would otherwise produce halation in the camera. It will be observed that the coloring or neutralizing of the rear reflectors 20 and 21 accomplishes the desired balancing of the illumination throughout the apertures A, B and C without resorting to a change in the front reflectors 22 and 23.

The present invention provides a light dividing means for cameras and the like which assures an even or balanced illumination at the several film apertures. The rear reflectors 20 and 21 may be neutralized or colored or both very inexpensively to bring about the illumination balancing action and no changes or additions are required in the optical system. The reflectors 20 and 21 may be inexpensively constructed and, if desired, may be replaced by similar reflectors of different color values and light transmitting values to change the action in the optical system. Picture records or negatives of any selected chromatic values may be produced by providing the correct chromatic relation between the filters X, Y and Z and the reflectors 20 and 21. The action of the neutralized or colored reflectors 20 and 21 in reducing the value of the light reflected by their rear surfaces may be such that there is no discernible line of separation between the light following the paths 29 and the light following the paths 27 and the picture records are evenly illuminated throughout. The invention contemplates a very wide variation in the extent of control of the light reflected by the rear surfaces of the reflectors 20 and 21 from a complete absorption or loss of such reflected light to practically no light loss. The formation or light value factor of the reflectors 20 and 21 varies, of course, in different cameras and where different reflectors, etc., are employed.

Having described only a typical preferred form and application of my invention, I do not wish to be limited or restricted to the specific details herein set forth, but wish to reserve to myself any variations or modifications that may fall within the scope of the following claims.

Having described my invention, I claim:

1. In photographic apparatus, a structure having an intermediate film aperture, side film apertures at each side of the intermediate apertures and a light admitting opening opposite the intermediate aperture, and light dividing means comprising an assembly of crossed reflectors of light transmitting material in the path of the light admitted by said opening, said assembly including front reflector sections and rear reflector sections, each transmitting a portion of the light and reflecting a portion of the light laterally toward the side apertures, the material of the front sections being clear the material of the rear sections having a lower light transmitting capacity than the material of the two front reflectors to control the light values at the apertures.

2. In photographic apparatus, a body structure having a light admitting opening, an intermediate aperture opposite the light admitting opening, and a lateral aperture at each side of the intermediate aperture, and light dividing means in the path of the admitted light for illuminating the several apertures comprising two front reflector sections and two rear reflector sections in converging relation to form a cross assembly, each front section transmitting light for passage to the rear sections and reflecting light laterally for passage through the other front section to a lateral aperture, the material of the front sections being clear and uncolored each rear section transmitting light to the intermediate aperture and reflecting light laterally to a lateral aperture, the light reflecting factor of the rear sections being lowered relative to the front sections to compensate for the light loss incident to the lateral transmission of light through the front sections and to compensate for the increased reflection of light from the rear sections to the lateral apertures because of the spacing of the rear reflectors from the light admitting opening.

3. In photographic apparatus, a body structure having a light admitting opening, an intermediate aperture opposite the light admitting opening, and a lateral aperture at each side of the intermediate aperture, and light dividing means in the path of the admitted light for illuminating the several apertures comprising two front reflector sections and two rear reflector sections in converging relation to form a cross assembly, each front section transmitting light for passage to the rear sections and reflecting light laterally for passage through the other front section to a lateral aperture, the material of the front sections being clear and uncolored each rear section transmitting light to the intermediate aperture and reflecting light laterally to a lateral aperture, and means reducing the effective light reflection from the rear surfaces of the rear sections to compensate for the increased reflection of light from rear sections to the lateral apertures resulting from the acuteness of the angle of incidence at the rear sections.

4. In photographic apparatus, a body structure having a light admitting opening, an intermediate aperture opposite the light admitting opening, and a lateral aperture at each side of the intermediate aperture, and light dividing means in the path of the admitted light for illuminating the several apertures comprising two front reflector sections and two rear reflector sections in converging relation to form a cross assembly, each front section transmitting light for passage to the rear sections and reflecting light laterally for passage through the other front section to a lateral aperture, the two front sections being formed of clear uncolored material, each rear section transmitting light to the intermediate aperture and reflecting light laterally to a lateral aperture, and means embodied in the rear reflector sections for reducing the transmission of light to the intermediate aperture and the reflection of light to the lateral apertures to control the light values at the apertures.

5. In photographic apparatus, a body structure having a light admitting opening, and a lateral aperture at each side of the intermediate aperture, and light dividing means in the path of the admitted light for illuminating the several apertures comprising two front reflector sections and two rear reflector sections in converging relation to form a cross assembly, the two front sections being formed of clear material, each front section transmitting light for passage to the rear sections and reflecting light laterally for passage through the other front section to a lateral aperture, each rear section transmitting light to the intermediate aperture and reflecting light laterally to a lateral aperture, and pigment in the material of the rear reflector sections for reducing the light transmission through the rear sections and for lowering the value of the light reflected from the rear surfaces of the rear sections to compensate for reflected light loss incident to the lateral transmission of light through the front sections and to compensate for the increase in light reflection from the rear sections caused by the increased angle of incidence at the rear reflectors.

6. In photographic apparatus, a body structure having a light admitting opening, an intermediate aperture opposite the light admitting opening, and a lateral aperture at each side of the intermediate aperture, color filters at the lateral apertures for chromatically influencing the light passed therethrough, two front reflector sections and two rear reflector sections arranged in converging relation to form a cross in the path of the admitted light, each front section transmitting light for passage to the rear sections and reflecting light laterally through the other front section to a lateral aperture, each rear section transmitting light to the intermediate aperture and reflecting light laterally to a lateral aperture, the two front sections being formed of clear material, and means for compensating for the light loss incident to the lateral transmission of light through the front sections and to compensate for the increase in light reflection from the rear sections caused by the increased angle of incidence at the rear reflectors; comprising chromatic means incorporated with the rear sections to chromatically influence the light reflected laterally by the rear surfaces of the rear sections so that such light is absorbed at least in part by said filters.

7. In photographic apparatus, a body structure having a light admitting opening, an intermediate aperture opposite the light admitting opening, and a lateral aperture at each side of the intermediate aperture, color filters at the lateral apertures for chromatically influencing the light passed therethrough, two front reflector sections and two rear reflector sections arranged in converging relation to form a cross in the path of the admitted light, each front section transmitting light for passage to the rear sections and reflecting light laterally through the other front section to a lateral aperture, the two front reflectors being clear and uncolored, each rear section transmitting light to the intermediate aperture and reflecting light laterally to a lateral aperture, the material of the rear sections being colored and chromatically related to the color filters so that the light reflected laterally by the rear surfaces of the rear sections is filtered out by the filters.

8. In photographic apparatus, a body structure having a light admitting opening, an intermediate aperture opposite the light admitting opening, and a lateral aperture at each side of the intermediate aperture, color filters at the lateral apertures for chromatically influencing the light passed therethrough, two front reflector sections and two rear reflector sections arranged in converging relation to form a cross in the path of the admitted light, each front section transmitting light for passage to the rear sections and reflecting light laterally through the other front section to a lateral aperture, the two front sections being clear to have a high light transmitting ability, each rear section transmitting light to the intermediate aperture and reflecting light laterally to a lateral aperture, the rear sections being partially opaque or neutral to reduce the value of the light transmitted to the intermediate aperture and to reduce the value of the light reflected from their rear surfaces laterally to the side apertures.

9. In photographic apparatus, a body structure having a light admitting opening, an intermediate aperture opposite the light admitting opening, and a lateral aperture at each side of the intermediate aperture, color filters at the lateral apertures for chromatically influencing the light passed therethrough, two front reflector sections and two rear reflector sections arranged in converging relation to form a cross in the path of the admitted light, each front section transmitting light for passage to the rear sections and reflecting light laterally through the other front section to a lateral aperture, the two front reflectors being clear, each rear section transmitting light to the intermediate aperture and reflecting light laterally to a lateral aperture, the rear sections being partially opaque or neutral to reduce the value of the light transmitted to the intermediate aperture and to reduce the value of the light reflected from their rear surfaces laterally to the side apertures, and the material of the rear sections having a hue relative to said filters to cause the light reflected from said rear surfaces to be filtered out at least in part by said filters.

10. In photographic apparatus, a body structure having a light admitting opening, an intermediate aperture opposite the light admitting opening, and a lateral aperture at each side of the intermediate aperture, color filters at the apertures, and light dividing means in the path of the admitted light for illuminating the several apertures comprising two front reflector sections and two rear reflector sections in converging relation to form a cross assembly, each front section transmitting light for passage to the rear sections and reflecting light laterally for passage through the other front section to a lateral aperture, each rear section transmitting light to the intermediate aperture and reflecting light laterally to a lateral aperture, the material of the front sections being clear and uncolored, the material of the rear sections having a color related to the filters at the lateral apertures to cause the light reflected from the rear surfaces of the rear reflectors to be absorbed at least in part by the filters at the lateral apertures and related to the filter at the intermediate aperture so that the light transmitted to the intermediate aperture has the required color value.

WALTER L. WRIGHT.